(12) United States Patent
Paini

(10) Patent No.: US 12,226,901 B2
(45) Date of Patent: Feb. 18, 2025

(54) SMART CHANGE EVALUATOR FOR ROBOTICS AUTOMATION

(71) Applicant: Bank of America Corporation, Charlotte, NC (US)

(72) Inventor: Siva Kumar Paini, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 372 days.

(21) Appl. No.: 17/376,306

(22) Filed: Jul. 15, 2021

(65) Prior Publication Data

US 2023/0018965 A1  Jan. 19, 2023

(51) Int. Cl.
*B25J 9/16* (2006.01)
*G05B 13/02* (2006.01)

(52) U.S. Cl.
CPC .......... *B25J 9/163* (2013.01); *G05B 13/0265* (2013.01)

(58) Field of Classification Search
None
See application file for complete search history.

(56) References Cited

U.S. PATENT DOCUMENTS

| | | | |
|---|---|---|---|
| 10,726,045 | B2 | 7/2020 | Sturtivant |
| 2016/0346928 | A1* | 12/2016 | Zhang .................. B25J 9/1679 |
| 2017/0006141 | A1 | 1/2017 | Bhadra |
| 2017/0052824 | A1 | 2/2017 | Sharma et al. |
| 2017/0083386 | A1 | 3/2017 | Wing et al. |

(Continued)

FOREIGN PATENT DOCUMENTS

| | | | | |
|---|---|---|---|---|
| CN | 105094049 B | * | 6/2022 | .............. B25J 9/163 |
| EP | 3675008 A1 | * | 7/2020 | .......... G06F 11/3438 |

(Continued)

OTHER PUBLICATIONS

Jimenez-Ramirez, Andres, et al. "A method to improve the early stages of the robotic process automation lifecycle." Advanced Information Systems Engineering: 31st International Conference, CAISE 2019, Rome, Italy, Jun. 3-7, 2019, Proceedings 31. Springer International Publishing, 2019. (Year: 2019).*

(Continued)

*Primary Examiner* — Thomas L Mansfield
(74) *Attorney, Agent, or Firm* — Banner & Witcoff, Ltd.

(57) ABSTRACT

A smart change evaluation engine analyzes an existing and updated Robotic Process Automation (RPA) system and process flow and evaluates identified changes in the process, components, elements, and controls. The smart change evaluation engine outputs an appropriate change estimate value corresponding to an amount of change and/or effort to modify the RPA process flow. The smart change evaluation engine analyzes the recorded changes and assigns a rule-based value for every corresponding component in the process flow. A scoring algorithm is used to generate a change estimate value based on the analysis of the pre-change recordings, the post-change recordings, and from the data values captured from the actual robotic automated system, by doing dual checks resulting in best calculated estimates. The scoring value derived is used as an input for evaluating changes for (RPA) that may be required to support further development of services and/or applications provided by an enterprise organization.

18 Claims, 6 Drawing Sheets

(56) References Cited

U.S. PATENT DOCUMENTS

| | | | |
|---|---|---|---|
| 2019/0324781 A1 | 10/2019 | Ramamurthy et al. | |
| 2020/0073686 A1 | 3/2020 | Hanke et al. | |
| 2020/0206920 A1* | 7/2020 | Ma | G06F 18/23213 |
| 2021/0107164 A1* | 4/2021 | Singh | B25J 13/006 |
| 2021/0110256 A1* | 4/2021 | Singh | G06N 5/046 |
| 2021/0152414 A1* | 5/2021 | Busbee | H04L 63/20 |
| 2021/0191843 A1* | 6/2021 | Stocker | G06F 18/2433 |
| 2022/0011734 A1* | 1/2022 | Hall | G06F 21/6218 |
| 2022/0172102 A1* | 6/2022 | Finkelshtein | G06F 9/542 |

FOREIGN PATENT DOCUMENTS

| | | | | |
|---|---|---|---|---|
| EP | 3937042 A1 * | 1/2022 | | G05B 19/0426 |
| WO | WO-2021076206 A1 * | 4/2021 | | B25J 13/006 |

OTHER PUBLICATIONS

Montero, Jesus Chacón, Andres Jimenez Ramirez, and Jose Gonzalez Enriquez. "Towards a method for automated testing in robotic process automation projects." 2019 IEEE/ACM 14th International Workshop on Automation of Software Test (AST). IEEE, 2019. (Year: 2019).*

Gao, Junxiong, et al. "Automated robotic process automation: A self-learning approach." On the Move to Meaningful Internet Systems: OTM 2019 Conferences: Confed. International Conf.: CoopIS, ODBASE, C&TC 2019, Rhodes, Greece, Oct. 21-25, 2019, Proceedings. Springer International Publishing, 2019 (Year: 2019).*

Jha, Nishant, Deepak Prashar, and Amandeep Nagpal. "Combining artificial intelligence with robotic process automation—an intelligent automation approach." Deep learning and big data for intelligent transportation: enabling technologies and future trends (2021): 245-264. (Year: 2021).*

Madakam, Somayya, Rajesh M. Holmukhe, and Durgesh Kumar Jaiswal. "The future digital work force: robotic process automation (RPA)." JISTEM—Journal of Information Systems and Technology Management 16 (2019): e201916001. (Year: 2019).*

Vuorimaa, Waltteri. Deep Learning Object Detection Models in Robotic Process Automation. MS thesis. 2020. (Year: 2020).*

* cited by examiner

RPA Values

| | Components | Elements | Controls |
|---|---|---|---|
| Process Flow 1 | 30 | 80 | 5 |
| Process Flow 2 | 25 | 100 | 6 |
| Process Flow 3 | 27 | 70 | 8 |
| ... | ... | ... | ... |
| Process Flow n | 20 | 50 | 2 |

Pre-Change Recorder Values

| | Components | Elements | Controls |
|---|---|---|---|
| Process Flow 1 | 30 | 80 | 5 |
| Process Flow 2 | 25 | 100 | 6 |
| Process Flow 3 | 27 | 70 | 8 |
| ... | ... | ... | ... |
| Process Flow n | 20 | 50 | 2 |

- Smart engine performs first validation on the recording variables using the rules and scoring algorithm
- Capture data points with scoring weightage for input to RPA code check
- RPA Engine performs second validation on RPA components data with the components scorings captured from recording
- Smart engine algorithm calculates the evaluation scoring and generates the output

Output Values

| Output Parameters | Components |
|---|---|
| Complexity | Value A |
| Change Estimate | Value B (%) |
| New Changes | Value C |
| Existing Changes | Value D |
| Reusable Component | Value E |

Post-Change Recorder Values

| | Components | Elements | Controls |
|---|---|---|---|
| Process Flow 1 | 35 | 100 | 6 |
| Process Flow 2 | 30 | 90 | 8 |
| Process Flow 3 | 27 | 70 | 9 |
| ... | ... | ... | ... |
| Process Flow new1 | 60 | 150 | 7 |
| Process Flow new2 | 70 | 100 | 10 |
| ... | ... | ... | ... |
| Process Flow n | 25 | 100 | 9 |

FIG. 5

SMART CHANGE EVALUATOR FOR ROBOTICS AUTOMATION

FIELD

Aspects described herein generally relate to computer systems and networks. More specifically, aspects of this disclosure relate to dynamic system parameter for robotics automation.

BACKGROUND

Robotic process automation (RPA) is a software technology that allows users to build, deploy, and manage software robots to emulate a human interacting with digital systems and/or software. Execution of RPA functionality depends on the application or system consistency. Any changes to the systems or processes will affect a dependency on the RPA solution. As such, system and/or process changes often require changes to be implemented with the corresponding RPA functionality to avoid failures. Current implementations require manual evaluation of the change efforts needed for RPA development where input is provided by system experts based on the application and process knowledge. However, many processes and systems have multiple interdependencies which may lead to inaccurate results and cause errors in development, leading to system downtime to correct the errors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately and efficiently analyzing current and changed RPA processes, capturing information of components, elements, controls in the process flow and building new rules and defined for every component, element and control to provide intelligent robotic automation change evaluations.

In some cases, a smart change evaluator (SCE) utility may analyze an existing RPA system and process flow (e.g., pre-changes) and an updated RPA system and process flow (e.g., post changes) and may evaluate every identified change in the process including changes to components, elements, controls. The SCE utility may output an appropriate change estimate value corresponding to an amount of change and/or effort to modify the RPA process flow. A smart change evaluation engine built in the SCE utility may analyze the recorded changes and may assign a rule-based value for every component in the process flow for the identified changes. The scoring algorithm may generate a change estimate value based on the analysis of the pre-change recordings, the post-change recordings, and from the data values captured from the actual robotic automated system, by doing dual checks resulting in best calculated estimates. The scoring value derived from the scoring algorithm by the smart change evaluation engine may be used as an input for evaluating changes for robotics process automation that may be required to support further development of services and/or applications provided by an enterprise organization.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 shows illustrative data input and output by the smart change evaluator for robotics process automation, in accordance with one or more illustrative arrangements.

DETAILED DESCRIPTION

Figure 1A:
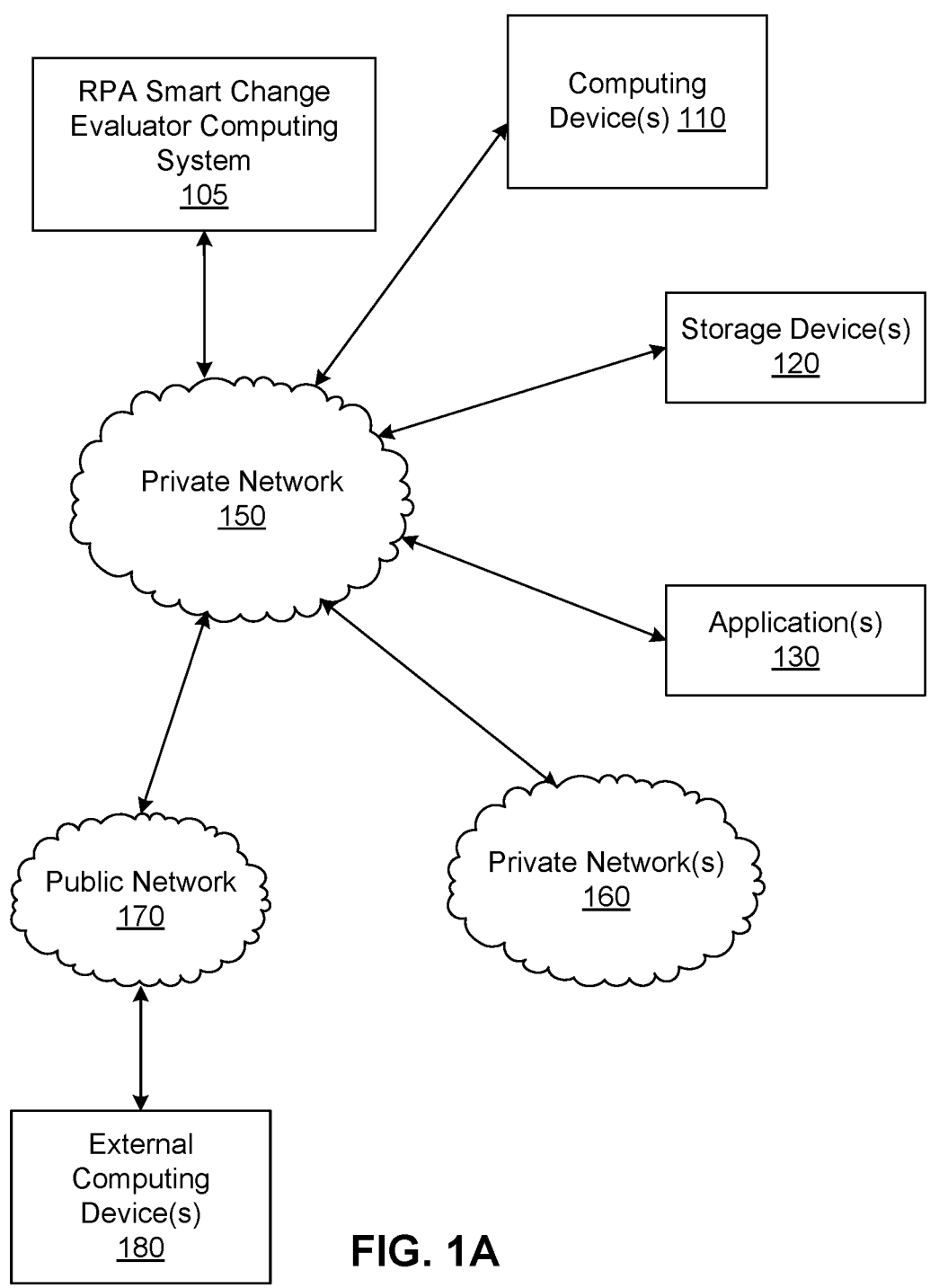
FIGS. 1A and 1B depict an illustrative RPA smart change evaluation computing environment, in accordance with one or more illustrative arrangements.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Various aspects of this disclosure relate to devices, systems, and methods for smart change analysis for robotics automation. An entity (e.g., a computing device, a private computing network, an enterprise organization, a multi-platform computing network, and the like) may be associated with an executable application developed on and/or deployed for execution and access by users via a first computing system environment, for example, including one or more private computing system environments. The entity may evolve or otherwise change an application such as to deploy and/or migrate the executable application to a second computing system environment, for example, including one or more third-party hosted cloud servers for a client-server system. The first computing system environment and/or the second computing system environment may include one or more of a web server, an application server, a database server, an encryption device, a storage device, or a file server.

Robotics process automation may be used to build, deploy, and manage software robots to emulate human interaction with digital systems and/or software applications. Software robots or bots, provided through an RPA system, may be used to perform repetitive and/or "lower-value" actions, such as logging into applications and systems, moving files and folders, extracting, copying, and inserting data, filling in forms, and completing routine analyses and reports. In some cases, bots may perform cognitive processes like interpreting text, engaging in chats and conversations, understanding unstructured data, and applying advanced machine learning models to make complex decisions.

The RPA processes may be trained for a particular release of an application to test operations based on displayed elements on a screen, complete actions through keystrokes and navigating systems, and may be used to identify and extract data, and/or perform a wide range of defined actions. The entity may perform aspects of smart change evaluation for robotics automation of the executable applications based on an expectation of various benefits, for example, increased processing speeds, greater throughput, ability to handle more simultaneous users or user requests, and/or straightforward scalability as the number of users increases or decreases. The scalability benefits may include meeting dynamically changing computing capabilities requirements without requiring dedicated resources to meet the maximum peak performance requirements at all times, although the maximum peak performance may only be infrequently required. Executable code (e.g., computer source code written in a computer programming language such as PYTHON, JAVA SCRIPT, and the like) for the executable application may have been modified such as to add features and/or functionality, target a second computing system environment, and/or may be recompiled with libraries targeted toward the second computing system environment. However, these modifications may not be capable of being tested by existing RPA processes.

To be effective, execution of robotics automation depends on application or system consistency. Any changes to the systems or processes may result in problems during execution of an RPA robotic (bot) solution. Such dependencies with the RPA bot solution may require changes to be implemented to the RPA robotic process, or the bot may fail to execute properly. Often, not all changes made to the application and/or target systems are known or easily identifiable. As such, to evaluate the efforts needed for RPA change development, information may be estimated based on an incomplete subset of application and/or process knowledge, which may not be accurate. This leads to wrong estimates, which may then result in unexpected system downtime until the process can be re-evaluated.

As described herein, the RPA smart change evaluation computing system may analyzes operation of existing RPA processes with an existing application and operation of the RPA process with the changes made to the system and/or processes flow and considering every change made to process including components, elements, and controls. The RPA smart change evaluation computing system determines, based on the gathered information, an appropriate change estimate value. A smart change evaluation engine may analyze the recorded process flow information, before and after any changes, and associates a rule-based value to every component in the process flow. A scoring algorithm used by the smart change evaluation engine may generate the change estimate value from the recorded information and from the data values captured from the actual robotic automated system, such as by doing dual checks to output best calculated estimates. The change estimate value may be used as an input for evaluating Robotics Automation changes required for the development.

In some cases, a data extraction engine may record, end to end, a process before any changes have been made and then a second time after changes have been made. During these recordings, the data extraction engine may capture relevant information corresponding to components, elements, controls in the process flow. The data extraction engine may analyze various parameters captured in the recordings and may then validate the data with the values captured from the actual robotic automated system. Such analysis is outside the scope of current robotic automation system change processes. In some cases, the smart change evaluation engine may process combinations of estimates, as derived from the recordings, and may validate the estimates and/or information gathered with the recordings against the values from actual robotic automated system to provide efficient output evaluation and to provide accurate information about change complexity. The RPA smart change evaluation computing system provides a realistic and automated approach to identify and detect newly changed components, identify reusable components of the RPA process flow, and identify changes to the existing code components along with estimated values and metrics such as a change percentage value to identify which objects may be changed and to accurately evaluate the changes. The smart change evaluation engine may intelligently detect rules defined for every component, elements, controls in the process flow, where obtained values are passed to scoring algorithm. In some cases, the smart change evaluation engine may include customization options for customized features based on the analysis if some changed components are indeterminate. The smart change evaluation engine includes machine learning-based intelligence to identify new rules and may dynamically build the identified new rules automatically, such as by a rules engine, as part of a self-learning process. The smart change evaluation engine may store information corresponding to a size of components the RPA bot code to assist with self-learning to improve future estimates.

Figure 1B:
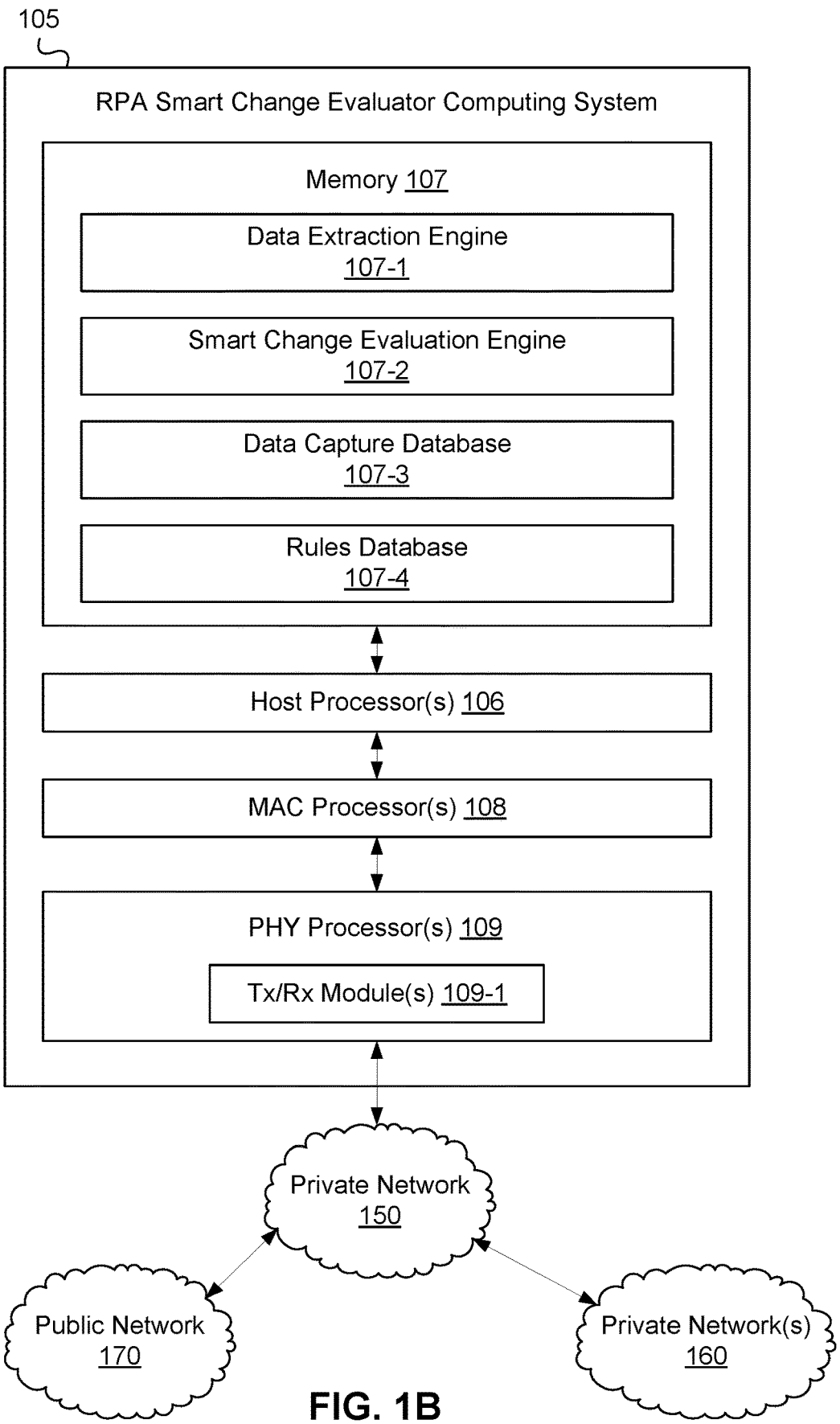

FIGS. 1A and 1B show an illustrative computing environment 100 for implementing aspects described herein, in accordance with one or more example arrangements. Referring to FIG. 1A, the computing environment 100 may comprise one or more devices (e.g., computer systems, communication devices, servers). The computing environment 100 may include, for example, an RPA smart change evaluator computing system 105, one or more computing device(s) 110, and one or more storage device(s) 120 linked over a private network 150. The storage device(s) 120 may comprise a database, for example, a relational database (e.g., Relational Database Management System (RDBMS), Structured Query Language (SQL), and the like). One or more application(s) 130 may operate on one or more computing devices or servers associated with the private network 150. The private network 150 may comprise an enterprise private network, for example.

The computing environment 100 may comprise one or more networks (e.g., public networks and/or private networks), which may interconnect one or more of the RPA smart change evaluator computing system 105, the computing device(s) 110, the storage device(s) 120, and/or one or more other devices and computing servers. One or more applications 130 may operate on one or more devices in the computing environment 100. The networks may use wired and/or wireless communication protocols. The private network 150 may be associated with, for example, an enterprise organization. The private network 150 may interconnect the RPA smart change evaluator computing system 105, the computing device(s) 110, the storage device(s) 120, and/or one or more other devices/servers which may be associated with the enterprise organization. The private network 150 may be linked to one or more other private network(s) 160 and/or a public network 170. The public network 170 may comprise the Internet and/or a cloud network. The private network 150 and the private network(s) 160 may correspond to, for example, a local area network (LAN), a wide area network (WAN), a peer-to-peer network, or the like.

A user in a context of the computing environment 100 may be, for example, an associated user (e.g., an employee, an affiliate, or the like) of the enterprise organization. An external user (e.g., a client) may utilize services being provided by the enterprise organization, and access one or more resources located within the private network 150 (e.g., via the public network 170). One or more users may operate one or more devices in the computing environment 100 to send messages to and/or receive messages from one or more other devices connected to or communicatively coupled with the computing environment 100. The enterprise organization may correspond to any government or private institution, an educational institution, a financial institution, a health services provider, a retailer, or the like.

As illustrated in greater detail below, the RPA smart change evaluator computing system 105 may comprise one or more computing devices configured to perform one or more of the functions described herein. The RPA smart change evaluator computing system 105 may comprise, for example, one or more computers (e.g., laptop computers, desktop computers, computing servers, server blades, or the like).

The computing device(s) 110 may comprise one or more of an enterprise application host platform, an enterprise user computing device, an administrator computing device, and/or other computing devices, platforms, and servers associated with the private network 150. The enterprise application host platform(s) may comprise one or more computing devices and/or other computer components (e.g., processors, memories, communication interfaces). The enterprise application host platform may be configured to host, execute, and/or otherwise provide one or more enterprise applications. The enterprise application host platform(s) may be configured, for example, to host, execute, and/or otherwise provide one or more transaction processing programs, user servicing programs, and/or other programs associated with an enterprise organization. The enterprise application host platform(s) may be configured to provide various enterprise and/or back-office computing functions for an enterprise organization. The enterprise application host platform(s) may comprise various servers and/or databases that store and/or otherwise maintain account information, such as financial/membership account information including account balances, transaction history, account owner information, and/or other information corresponding to one or more users (e.g., external users). The enterprise application host platform(s) may process and/or otherwise execute transactions on specific accounts based on commands and/or other information received from other computer systems comprising the computing environment 100. The enterprise application host platform(s) may receive data from the RPA smart change evaluator computing system 105, manipulate and/or otherwise process such data, and/or return processed data and/or other data to the RPA smart change evaluator computing system 105 and/or to other computer systems in the computing environment 100.

The enterprise user computing device may comprise a personal computing device (e.g., desktop computer, laptop computer) or mobile computing device (e.g., smartphone, tablet). The enterprise user computing device may be linked to and/or operated by a specific enterprise user (e.g., an employee or other affiliate of an enterprise organization).

The administrator computing device may comprise a personal computing device (e.g., desktop computer, laptop computer) or mobile computing device (e.g., smartphone, tablet). The administrator computing device may be linked to and/or operated by an administrative user (e.g., a network administrator of an enterprise organization). The administrator computing device may receive data from the RPA smart change evaluator computing system 105, manipulate and/or otherwise process such data, and/or return processed data and/or other data to the RPA smart change evaluator computing system 105 and/or to other computer systems in the computing environment 100. The administrator computing device may be configured to control or configure operation of the RPA smart change evaluator computing system 105.

The application(s) 130 may comprise transaction processing programs, user servicing programs, and/or other programs associated with an enterprise organization. The application(s) 130 may correspond to applications that provide various enterprise and/or back-office computing functions for an enterprise organization. The application(s) 130 may correspond to applications that facilitate storage, modification, and/or maintenance of account information, such as financial/membership account information including account balances, transaction history, account owner information, and/or other information corresponding to one or more users (e.g., external users). The application(s) 130 may process and/or otherwise execute transactions on specific accounts based on commands and/or other information received from other computer systems comprising the computing environment 100. The application(s) 130 may operate in a distributed manner across multiple computing devices (e.g., the computing device(s) 110) and/or servers, operate on a single computing device and/or server. The application(s) 130 may be used for execution of various operations corresponding to the one or more computing devices (e.g., the computing device(s) 110) and/or servers.

The storage device(s) 120 may comprise various memory devices such as hard disk drives, solid state drives, magnetic tape drives, or other electronically readable memory, and/or the like. The storage device(s) 120 may be used to store data corresponding to operation of one or more applications within the private network 150 (e.g., the application(s) 130), and/or computing devices (e.g., the computing device(s) 110). The storage device(s) 120 may receive data from the RPA smart change evaluator computing system 105, store the data, and/or transmit the data to the RPA smart change evaluator computing system 105 and/or to other computing systems in the computing environment 100.

The private network(s) 160 may have an architecture similar to an architecture of the private network 150. The private network(s) 160 may correspond to, for example, another enterprise organization that communicates data with the private network 150. The private network 150 may also be linked to the public network 170. The public network 170 may comprise the external computing device(s) 180. The external computer device(s) 180 may include a personal computing device (e.g., desktop computer, laptop computer) and/or a mobile computing device (e.g., smartphone, tablet). The external computing device(s) 180 may be linked to and/or operated by a user (e.g., a client, an affiliate, or an employee) of an enterprise organization associated with the private network 150. The user may interact with one or more enterprise resources while using the external computing device(s) 180 located outside of an enterprise firewall.

The RPA smart change evaluator computing system 105, the computing device(s) 110, the external computing device (s) 180, and/or one or more other systems/devices in the computing environment 100 may comprise any type of computing device capable of receiving input via a user interface, and may communicate the received input to one or more other computing devices. The RPA smart change evaluator computing system 105, the computing device(s) 110, the external computing device(s) 180, and/or the other systems/devices in the computing environment 100 may, in some instances, comprise server computers, desktop computers, laptop computers, tablet computers, smart phones, wearable devices, or the like that in turn comprise one or more processors, memories, communication interfaces, storage devices, and/or other components. Any and/or all of the RPA smart change evaluator computing system 105, the computing device(s) 110, the storage device(s) 120, and/or other systems/devices in the computing environment 100 may be, in some instances, special-purpose computing devices configured to perform specific functions.

Referring to FIG. 1B, the RPA smart change evaluator computing system 105 may comprise one or more of host processor(s) 106, memory 107, medium access control (MAC) processor(s) 108, physical layer (PHY) processor(s) 109, transmit/receive (Tx/Rx) module(s) 109-1, or the like. One or more data buses may interconnect host processor(s) 106, memory 107, MAC processor(s) 108, PHY processor(s) 109, and/or Tx/Rx module(s) 109-1. The RPA smart change evaluator computing system 105 may be implemented using one or more integrated circuits (ICs), software, or a combination thereof, configured to operate as discussed below. The host processor(s) 106, the MAC processor(s) 108, and the PHY processor(s) 109 may be implemented, at least partially, on a single IC or multiple ICs. Memory 107 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 108 and/or the PHY processor(s) 109 of the RPA smart change evaluator computing system 105 may be configured to generate data units, and process received data units, that conform to any suitable wired and/or wireless communication protocol. For example, the MAC processor(s) 108 may be configured to implement MAC layer functions, and the PHY processor(s) 109 may be configured to implement PHY layer functions corresponding to the communication protocol. The MAC processor(s) 108 may, for example, generate MAC data units (e.g., MAC protocol data units (MPDUs)), and forward the MAC data units to the PHY processor(s) 109. The PHY processor(s) 109 may, for example, generate PHY data units (e.g., PHY protocol data units (PPDUs)) based on the MAC layer data units. The generated PHY data units may be transmitted via the Tx/Rx module(s) 109-1 over the private network 150, the private network(s) 160, and/or the public network 170. Similarly, the PHY processor(s) 109 may receive PHY data units from the Tx/Rx module(s) 109-1, extract MAC layer data units encapsulated within the PHY data units, and forward the extracted MAC data units to the MAC processor(s). The MAC processor(s) 108 may then process the MAC data units as forwarded by the PHY processor(s) 109.

One or more processors (e.g., the host processor(s) 106, the MAC processor(s) 108, the PHY processor(s) 109, and/or the like) of the RPA smart change evaluator computing system 105 may be configured to execute machine readable instructions stored in memory 107. Memory 107 may comprise (i) one or more program modules/engines having instructions that when executed by the one or more processors cause the RPA smart change evaluator computing system 105 to perform one or more functions described herein, and/or (ii) one or more databases that may store and/or otherwise maintain information which may be used by the one or more program modules/engines and/or the one or more processors. The one or more program modules/engines and/or databases may be stored by and/or maintained in different memory units of the RPA smart change evaluator computing system 105 and/or by different computing devices that may form and/or otherwise make up the RPA smart change evaluator computing system 105. For example, memory 107 may have, store, and/or comprise a data extraction engine 107-1, a smart change evaluation engine 107-2, a data capture database 107-3 and/or a rules database 107-4. The data extraction engine 107-1 and the smart change evaluation engine 107-2 may comprise instructions that direct and/or cause the RPA smart change evaluator computing system 105 to perform one or more operations, as discussed in greater detail below. The data capture database 107-3 and/or the rules database 107-4 may comprise, for example, a relational database (e.g., Relational Database Management System (RDBMS), Structured Query Language (SQL) database, and the like). The data capture database 107-3 may include information pertaining to one or more applications 130 being assessed during a pre-change analysis recording and a post change analysis recording by the RPA smart change evaluator computing system 105 to identify changes in components, elements, controls and/or other parameters in a process flow as provided through one or more of the applications 130. In some cases, changes made to the process flow may be indicated as part of the changes and implemented in a post-change implementation. The rules database 107-4 may store information used to identify and detecting changed components, reusable components and any other changes to existing RPA code and for estimating values and percentages of changed components. The rules database 107-4 may store rules defined for each component, element control and/or parameter in the process flow, and/or scoring algorithms and/or values used for the scoring algorithms regarding options for customized features in the changed RPA processes.

While FIGS. 1A and 1B illustrate the RPA smart change evaluator computing system 105 as being separate from other elements connected in the private network 150, in one or more other arrangements, the RPA smart change evaluator computing system 105 may be included in one or more of the computing device(s) 110, and/or other device/servers associated with the private network 150. Elements in the RPA smart change evaluator computing system 105 (e.g., host processor(s) 106, memory(s) 107, MAC processor(s) 108, PHY processor(s) 109, and Tx/Rx module(s) 109-1, one or more program modules and/or stored in memory(s) 107) may share hardware and/or software elements with and corresponding to, for example, one or more of the computing device(s) 110, and/or other device/servers associated with the private network 150.

Figure 2:
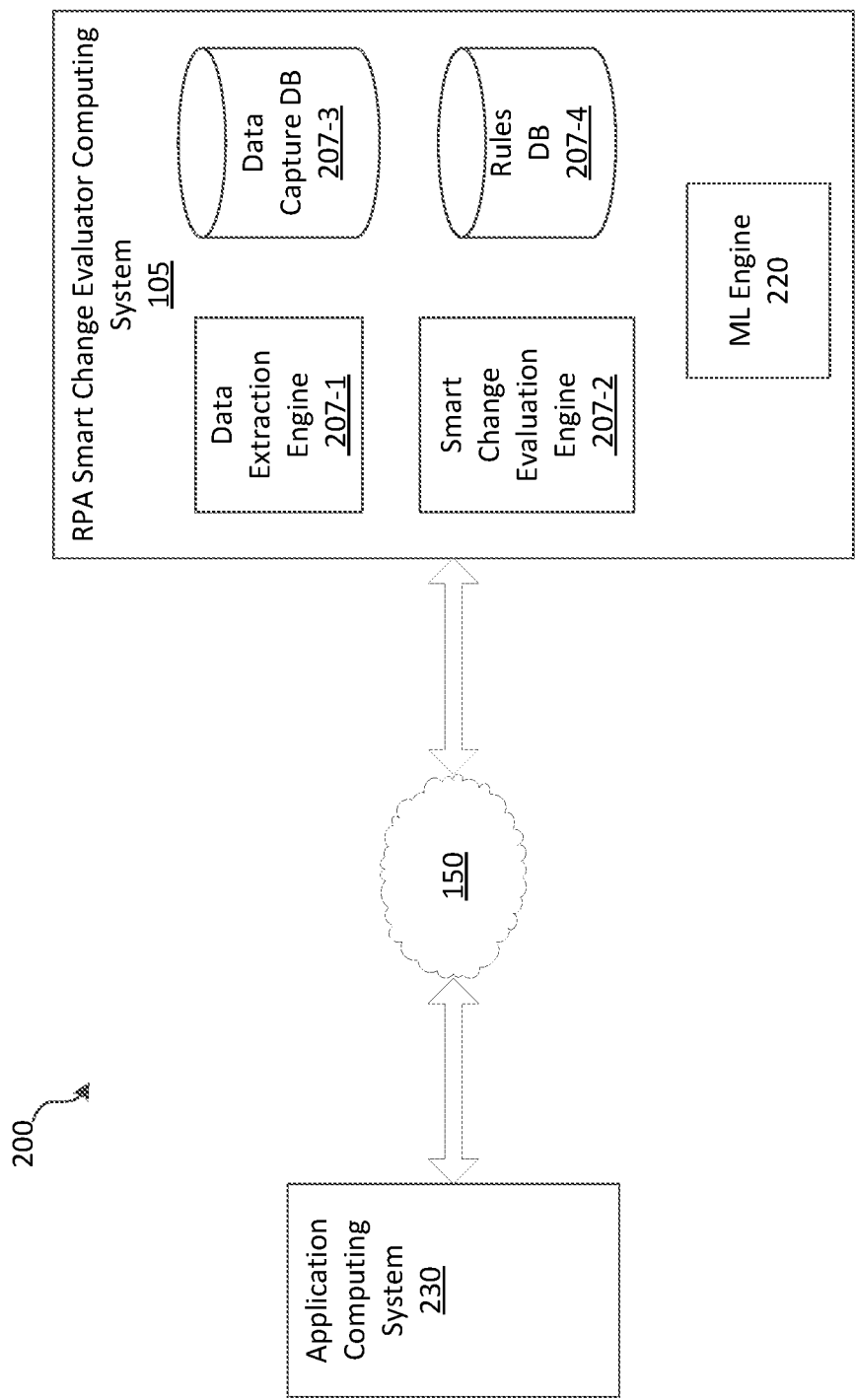
FIG. 2 depicts a system including a smart change evaluation engine for robotics process automation, in accordance with one or more illustrative arrangements.

FIG. 2 shows a system 200 including a smart change evaluation engine for robotics process automation, in accordance with one or more illustrative arrangements. The system 200 may include the RPA smart change evaluation computing system 105 that may be communicatively coupled to an application computing system 230 via the network 150. The RPA smart change evaluator computing system may include a data extraction engine 207-1, a smart change evaluation engine 207-3, a data capture database 207-3, a rules database 207-4 and/or a machine learning (ML) engine 220.

Figure 3:
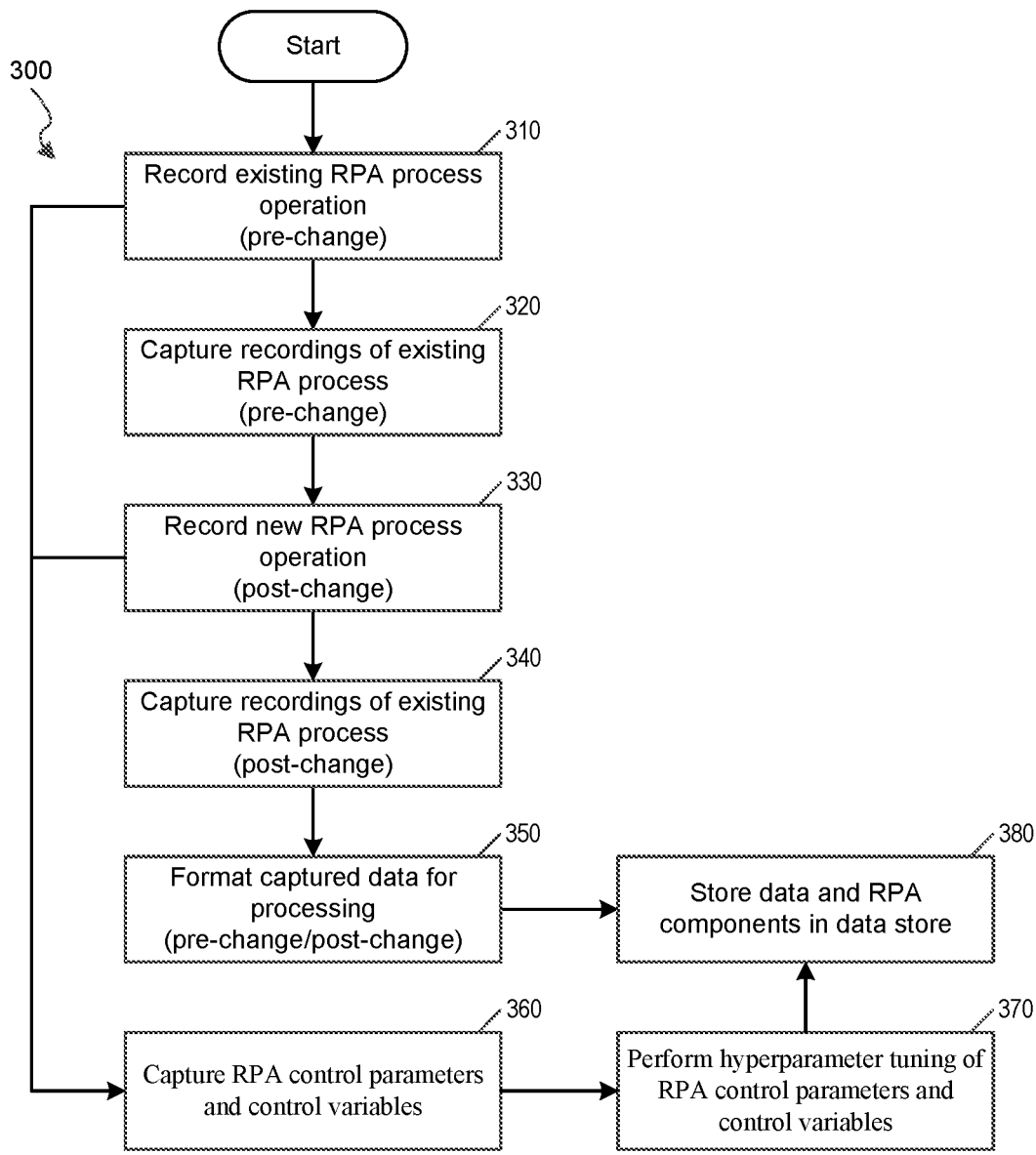
FIG. 3 depicts a process flow for capturing RPA process information, in accordance with one or more illustrative arrangements.

FIG. 3 depicts a process flow 300 for capturing RPA process information, in accordance with one or more illustrative arrangements. At 310, the data extraction engine 207-1 may initiate recording of an existing RPA process operation with an application before any changes have been applied, where the recordings of the existing RPA process operations may be captured and saved at 320. For example, the data extraction engine 207-1 may extract control information and wait for a request to run. If, no run request is received the processing may stop. With a valid run request, the data extraction engine 207-1 may run code for recording an RPA process to an unchanged application to identify components, elements, controls, and/or other variables or parameters. For example, the data extraction engine may identify fields, buttons, data values, pages, reports, and the like. Similarly, at 330, the data extraction engine 207-1 may initiate recording of an a new (or the existing) RPA process operation with an application after new changes to the application have been applied, where the recordings of the changed RPA process operations may be captured and saved at 340. For example, during the operation of the RPA process post-changes, the data extraction engine 207-1 may run code for recording an RPA process to an unchanged application to identify components, elements, controls, and/or other variables or parameters. Once captured, the data may be formatted for processing, such as being packaged, delimiters may be applied, inline configuration may be performed and/or data points may be captured and saved to the data capture database 207-3.

Additionally, during capture of the existing RPA process and new RPA process operation with the changed application, various RPA control parameters and/or control variables may be captured at 360. At 350, the data extraction engine 207-1 may format captured data, both pre-change and post-change, for processing by the smart change evaluation engine and the captured and formatted data may be stored in the data captured database 207-3, at 380. For example, the data extraction engine 207-1 may monitor operation of controller variable execution during operation of the RPA process. If the controller variable executed, the data extraction engine 207-1 may then determine whether the controller variable did not execute due to an event failure and data may be stored in the data capture database 207-3. In some cases, an event may be rerun and the data extraction engine 207-1 may attempt to identify additional RPA control variables, RPA components, RPA elements, and/or other RPA variables or parameters. If a control variable has executed, the event was a success and a data point may be captured and stored in the data capture database 207-3. The RPA control parameters and/or control variables captured at 360, may be further processed at 370 by the data extraction engine 207-1. For example, the data extraction engine 207-1 may perform hyperparameter tuning of one or more of the control parameters and/or control variables at 370 before saving the captured and/or hyper-tuned information in the data capture database 207-3 at 380.

Figure 4:
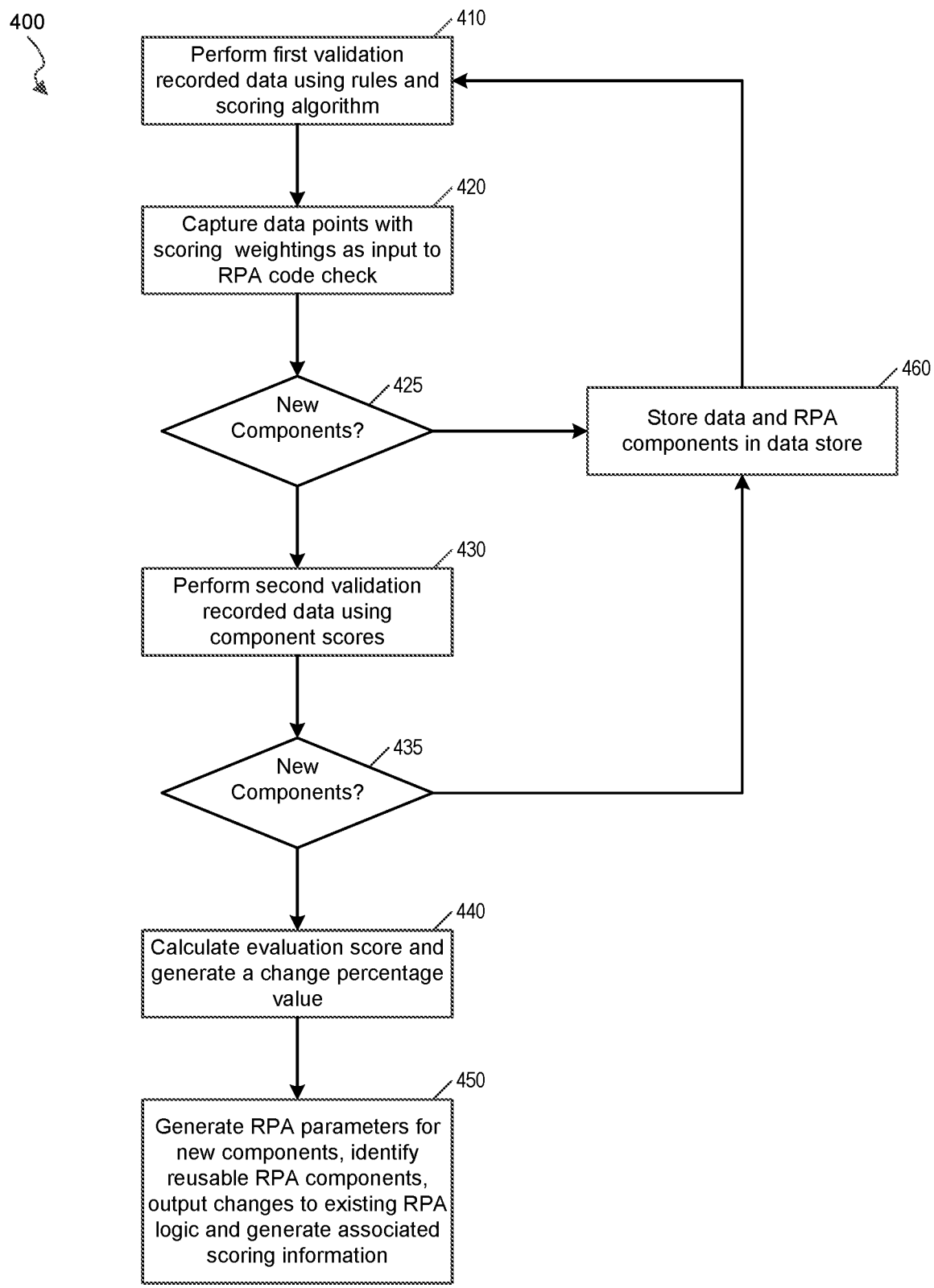
FIG. 4 depicts a process flow for performing smart change evaluation for robotics process automation, in accordance with one or more illustrative arrangements.

FIG. 4 shows a process flow 400 for performing smart change evaluation for robotics process automation, in accordance with one or more illustrative arrangements. At 410, the smart change evaluation engine 207-2 may perform a first validation of recorded data using rules and a scoring algorithm at 410. Data points may be captured with the scoring weightings, at 420, to be used as an input to a check of the RPA code by the smart change evaluation engine 207-2. At 425, if the smart change evaluation engine 207-2 recognizes new components, the resulting information about the new components may be stored in the data capture database 207-3 at 460 and the smart change evaluation engine 207-2 may continue performing validation of the recorded data using rules stored in the rules database 207-4, at 410.

If, at 425, no new components are found, the smart change evaluation engine may perform a second validation process of the recorded data using component scores, at 430. At 435, the smart change evaluation engine 207-2 may determine whether new components have been found during the second validation process. If so, the new data may be stored in the data capture database 207-3 at 460 and the first validation process may be re-started at 410 by the smart change evaluation engine 207-2. If, at 435, no new components were identified during the second validation process, the smart change evaluation engine 207-2 may calculate an evaluation score and/or may generate a change percentage value corresponding to an amount of changes required to the RPA process to function with the newly changed application under test. At 450, the smart change evaluation engine 207-2 may generate new RPA parameters corresponding to the new components. Also, the smart change evaluation engine 207-2 may identify reusable components of existing RPA processes and may output changes to the existing RPA logic and/or generate additional scoring information.

FIG. 5 shows illustrative data input and output by the smart change evaluator for robotics process automation, in accordance with one or more illustrative arrangements. In this example, the smart change evaluator computing system 105 and the data extraction engine 107-1, 207-1 may perform a first validation on the recording variables for an application comprising a plurality of processes before any changes are applied and collect information regarding the components, elements and controls (e.g., table 510) and for the process after changes have been applied and collect information regarding the components, elements, and controls (e.g., table 520). Once collected, the smart change evaluation engine 107-2, 207-2 may capture datapoints and calculate associated scoring weightings for input into an RPA code check module, such as ML engine 220. Additionally the smart change evaluation engine 107-2, 207-2 may perform a second validation on RPA components data with the components scorings captured from recording the pre-change and post-change operations in the process flow(s) ash shown in table 530. The smart change evaluation engine 107-2, 207-2 may then calculate scorings and weightings and generate an output shown in table 540. Such data may be used to automatically generate RPA rules and/or processes to modify existing RPA processes and/or generate new RPA processes to run post-change operations. In general, the RPA smart change evaluation engine 107-2, 207-2 rules and/or ML engine may utilize the output of the analysis (e.g., Table 540) to generate new RPA parameters, controls and/or elements and/or identify existing RPA components capable of being reused to perform one or more of the following, as required in the post-change implementation, such as Launching and using various applications (e.g., opening emails and attachments, performing login and/or user identification activities, moving files and/or folders, copying information from a source location to a destination, and the like), integrating with various enterprise tools (e.g., communicating via SDK and/or API functions, reading and/or writing to one or more data stores), validating and/or augmenting data, validating an online or user-facing activity (e.g., an online service), capturing data from external sources (e.g., capturing social media data, and the like), data processing activities (e.g. form filling and the like), following logical rules (e.g., if/then rules, and the like), performing calculations, extracting data from documents, validating data displayed in user interfaces and/or the like. The output variables may include one or more of a complexity parameter corresponding to the complexity of the automation process and/or a complexity of changes needed to modify the RPA process from a pre-change state to a post-change state, a change estimate parameter that may be indicative of a percentage of components, elements, controls that require change and/or may be proportional to a percentage of reusable existing components, a new changes parameter indicative of changes newly identified by the RPA smart change evaluation engine and/or the ML engine, an existing changes parameters corresponding to a number of changes to existing components already modified with the post-change implementation, and a reusable components parameters corresponding to a number of identified components that may be reused.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:
at least one processor;
a memory storing computer-readable instructions that, when executed by the at least one processor, cause the computing platform to:
 initiate, automatically by a machine learning (ML)-based smart change evaluation engine, operation of robotics process automation (RPA) activity operating with a first instance of an automated process;
 capture, by a data extraction engine, first information corresponding to the operation of the RPA activity with the first instance of the automated process;
 initiate, automatically by the machine learning (ML)-based smart change evaluation engine, operation of an RPA process with a second instance of the automated process;
 capture, by the data extraction engine, second information corresponding to the operation of the RPA process with the second instance of the automated process;
 validate, by the ML-based smart change evaluation engine, the first information and the second information using rules and a scoring algorithm;
 generate, by the ML-based smart change evaluation engine based on the validated first information and the validated second information, RPA change output parameters;
 generate, automatically by the ML-based smart change evaluation engine based on the RPA change output parameters, an updated RPA activity for testing of the second instance of the automated process;
 generate, automatically, RPA rules;
 generate, based on the generated RPA rules, RPA change output parameters, and a number of identified reusable RPA process components, a new RPA process to run post change operations;
 retrain, by the ML-based smart change evaluation engine and based the RPA change output parameters and the generated RPA rules, the new RPA process as part of a self-learning process;

derive, by the ML-based smart change evaluation engine and from recordings of the RPA activity with the first instance of the automated process, change estimates corresponding to component changes of the second instance of the automated process from the first instance of the automated process;

identify, by the ML-based smart change evaluation engine and based on the change estimates, changes to existing code components of the automated process to identify changed objects; and generate, automatically by a machine learning engine and based on identified change objects of the existing code components of the automated process, new rules for generating the change estimates; and improve, via a self-learning process of the machine learning engine, future estimates derived during validation of recorded future instances of the automated process.

2. The computing platform of claim 1 wherein the instructions cause the computing platform to:

receive, via a network, a configuration file comprising indications of changes implemented in the second instance of the automated process; and modify, automatically and based on the configuration file, the RPA process before initiating operation with the second instance of the automated process.

3. The computing platform of claim 1 wherein the instructions cause the computing platform to perform machine learning of RPA rules based on the first information and the second information.

4. The computing platform of claim 1, wherein the RPA change output parameters comprise at least one of a change indication or a change percentage value.

5. The computing platform of claim 1, wherein the instructions cause the computing platform to generate at least one new component to the RPA activity and at least one reusable component from the RPA process.

6. The computing platform of claim 1, wherein the instructions cause the computing platform to calculate a number of reusable RPA components.

7. The computing platform of claim 1, wherein the instructions cause the computing platform to calculate a number of RPA components requiring change.

8. A non-transitory computer readable medium storing computer-readable instructions that, when executed by a processor, cause a computing device to:

initiate, automatically by a machine learning (ML)-based smart change evaluation engine, operation of robotics process automation (RPA) activity operating with a first instance of an automated process;

capture, by a data extraction engine, first information corresponding to the operation of the RPA activity with the first instance of the automated process;

initiate, automatically by the machine learning (ML)-based smart change evaluation engine, operation of an RPA process with a second instance of the automated process, wherein the first instance of the automated process is different than the second instance of the automated process;

capture, by a data extraction engine, second information corresponding to the operation of the RPA process with the second instance of the automated process;

validate, by the ML-based smart change evaluation engine, the first information and the second information using rules and a scoring algorithm;

generate, by the ML-based smart change evaluation engine, based on the validated first information and the validated second information, RPA change output parameters;

generate, automatically by the ML-based smart change evaluation engine based on the RPA change output parameters, an updated RPA activity for testing of the second instance of the automated process;

generate, automatically, RPA rules;

generate, based on the generated RPA rules, RPA change output parameters, and a number of identified reusable RPA process components, a new RPA process to run post change operations;

retrain, by the ML-based smart change evaluation engine, and based the RPA change output parameters and the generated RPA rules, the new RPA process;

derive, by the ML-based smart change evaluation engine and from recordings of the RPA activity with the first instance of the automated process, change estimates corresponding to component changes of the second instance of the automated process from the first instance of the automated process;

identify, by the ML-based smart change evaluation engine and based on the change estimates, changes to existing code components of the automated process to identify changed objects; and generate, automatically by a machine learning engine and based on identified change objects of the existing code components of the automated process, new rules for generating the change estimates; and improve, via a self-learning process of the machine learning engine, future estimates derived during validation of recorded future instances of the automated process.

9. The non-transitory computer readable medium of claim 8 wherein the instructions cause the computing device to:

receive, via a network, a configuration file comprising indications of changes implemented in the second instance of the automated process; and modify, based on the configuration file, the RPA process before initiating operation with the second instance of the automated process.

10. The non-transitory computer readable medium of claim 8 wherein the instructions cause the computing device to perform machine learning of RPA rules based on the first information and the second information.

11. The non-transitory computer readable medium of claim 8, wherein the RPA change output parameters comprise at least one of a change indication or a change percentage value.

12. The non-transitory computer readable medium of claim 8, wherein the instructions cause the computing device to generate at least one new component to the RPA activity and at least one reusable component from the RPA process.

13. The non-transitory computer readable medium of claim 8, wherein the instructions cause the computing device to calculate a number of reusable RPA components.

14. The non-transitory computer readable medium of claim 8, wherein the instructions cause the computing device to calculate a number of RPA components requiring change.

15. A method comprising:

initiating, by a computing device processing instructions of a data change evaluation engine, operation of robotics process automation (RPA) activity operating with a first instance of an automated process;

capturing, by the data change evaluation engine, first information corresponding to the operation of the RPA activity with the first instance of the automated process;

initiating, by the data change evaluation engine, operation of an RPA process with a second instance of the automated process;

capturing, by the data change evaluation engine, second information corresponding to the operation of the RPA process with the second instance of the automated process;

validating, by the computing device processing instructions of a smart change evaluation engine, the first information and the second information using rules and a scoring algorithm;

generating, by the smart change evaluation engine, based on the validated first information and the validated second information, RPA change output parameters;

generating, by the smart change evaluation engine, based on the RPA change output parameters, an updated RPA activity for testing of the second instance of the automated process;

generating, automatically, RPA rules;

generating, based on the generated RPA rules, RPA change output parameters, and a number of identified reusable RPA process components, a new RPA process to run post change operations; and retraining, by the smart change evaluation engine and based the RPA change output parameters and the generated RPA rules, the new RPA process as part of a self-learning process;

deriving, by the smart change evaluation engine and from recordings of the RPA activity with the first instance of the automated process, change estimates corresponding to component changes of the second instance of the automated process from the first instance of the automated process;

identifying, by the smart change evaluation engine and based on the change estimates, changes to existing code components of the automated process to identify changed objects; and generating, automatically by a machine learning engine and based on identified change objects of the existing code components of the automated process, new rules for generating the change estimates; and improving, via a self-learning process of the machine learning engine, future estimates derived during validation of recorded future instances of the automated process.

16. The method of claim 15 comprising:

receiving, via a network, a configuration file comprising indications of changes implemented in the second instance of the automated process; and modifying, based on the configuration file, the RPA process before initiating operation with the second instance of the automated process.

17. The method of claim 15 comprising performing machine learning of RPA rules based on the first information and the second information.

18. The method of claim 15, wherein the RPA change output parameters comprise at least one of a change indication or a change percentage value.

* * * * *